(12) United States Patent
Lassen et al.

(10) Patent No.: US 8,196,442 B1
(45) Date of Patent: Jun. 12, 2012

(54) REUSABLE TAMPER INDICATING BAG CLOSURE

(75) Inventors: David Lassen, Arnold, MD (US); Charles F. Pribyl, Ralto, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 242 days.

(21) Appl. No.: 12/661,193

(22) Filed: Feb. 24, 2010

(51) Int. Cl.
*A45C 13/10* (2006.01)
(52) U.S. Cl. .................. 70/64; 70/14; 70/66; 24/305
(58) Field of Classification Search .......... 70/14, 64–66; 24/30.5
See application file for complete search history.

(56) References Cited

U.S. PATENT DOCUMENTS

| | | | | |
|---|---|---|---|---|
| 1,051,708 A * | 1/1913 | Doyle | | 70/64 |
| 1,055,002 A * | 3/1913 | Varnum | | 70/65 |
| 1,285,848 A * | 11/1918 | Waing | | 70/64 |
| 1,498,699 A * | 6/1924 | Smith | | 70/64 |
| 1,517,449 A * | 12/1924 | Murphy | | 70/64 |
| 3,147,607 A * | 9/1964 | Calvano et al. | | 70/64 |
| 3,535,746 A | 10/1970 | Thomas | | |
| 4,428,098 A * | 1/1984 | Coker et al. | | 24/30.5 R |
| 4,782,977 A | 11/1988 | Watanabe et al. | | |
| 4,926,526 A | 5/1990 | Brown et al. | | |
| 4,983,047 A * | 1/1991 | Netto | | 383/5 |
| 5,199,794 A | 4/1993 | Lipes | | |
| 5,375,300 A * | 12/1994 | Chen | | 24/30.5 R |
| 5,600,978 A * | 2/1997 | Netto | | 70/64 |
| 5,713,108 A * | 2/1998 | Solomon et al. | | 24/30.5 R |
| 7,201,410 B1 | 4/2007 | Lassen | | |
| 2006/0218977 A1* | 10/2006 | Witchey | | 70/14 |
| 2008/0155790 A1 | 7/2008 | Hsu | | |

* cited by examiner

*Primary Examiner* — Suzanne Barrett
(74) *Attorney, Agent, or Firm* — Roshni Kurian

(57) ABSTRACT

A reusable tamper indicating bag closure for transporting most items in a bag such as documents and portable computing devices including laptops, PDAs, mobile phones, iPods® . . . etc. that would appeal to a broad spectrum of customers including the individual buyer, the business user, and the government user. The tamper-evident bag closure is defined by a lid with multiple hasps and a base with knobs that attach to the bag and is secured by a locking mechanism placed through an opening on the base and inserted within an insertion aperture such that locking the lock mechanism causes the lid to slide into alignment with the base and engages the plurality of hasps with the plurality of knobs thus securing the bag. The bag closure also has several tamper indicating features including the use of tamper indicating markers, wire seals and tamper indicating labels.

12 Claims, 6 Drawing Sheets

REUSABLE TAMPER INDICATING BAG CLOSURE

FIELD OF INVENTION

The present invention pertains to bag closures, and in particular to tamper indicating bag closures.

BACKGROUND OF THE INVENTION

With the fast paced progression of today's technology, the need for tamper indicating bag is becoming more and more necessary for most users including business and government users. More than ever, there is a desire to protect important documents or devices that hold photos, music, and other information including confidential or classified information, specifically against the addition of malicious software or hardware that can occur as a result of a tampering attempt which can result in a significant loss to the user. Therefore, there is a great need for a device that can maintain the chain of custody so as to provide the user with the assurance that the information being protected has not been tampered with.

The prior art include simple bag fasteners and closure bands, as well other devices that offer minimal levels of protection. These include the following patents:

U.S. Pat. No. 3,535,746, entitled "Reusable Bag Fastener," discloses a twist on-and-off bag fastener that can be used to lock a bag by simply twisting the legs of the fastener into a twisted position. However the present invention employs a locking mechanism that is notably different from the invention disclosed in U.S. Pat. No. 3,535,746 in order to protect the information that is transported in the bag. U.S. Pat. No. 3,535,746 is hereby incorporated by reference into the specification of the present invention.

U.S. Pat. No. 4,782,977, entitled "Tamper Resistant Container," discloses a container that uses hasps to protect the contents of the container from tampering. While the present invention utilizes hasps, it also uses other means of securing the contents of the bag closure in a way that is distinguishable from the device taught in U.S. Pat. No. 4,782,977. U.S. Pat. No. 4,782,977 is hereby incorporated by reference into the specification of the present invention.

U.S. Pat. No. 4,926,526, entitled "Reusable Bag Closure," discloses a plastic hinged bag closure that can be utilized to close a bag by snapping the two opposing sides of the bag closure together. However this particular example of the prior art lacks the level of tamper resistance that the present invention offers. U.S. Pat. No. 4,926,526 is hereby incorporated by reference into the specification of the present invention.

U.S. Pat. No. 5,199,794, entitled "Plastic Bag with Reusable Neck Closure Band," discloses a device for locking a plastic bag and labeling the bag simultaneously. Unlike the present invention, U.S. Pat. No. 5,199,794 fails to provide any measure of tamper resistance. U.S. Pat. No. 5,199,794 is hereby incorporated by reference into the specification of the present invention.

U.S. Pat. No. 7,201,410 entitled "Reusable Tamper Evident Security Device," discloses a tamper evident device that can be used on a container to hold a security label. U.S. Pat. No. 7,201,410 is hereby incorporated by reference into the specification of the present invention.

U.S. Pat. Appl. Pub. US 2008/0155790, entitled "Reusable Autoclaveable Closure Device for a Flexible Bag," discloses a device for closing the open ends of a bag. As with much of the prior art, this device does not offer any tamper indicating measures as does the present invention. U.S. Pat. Appl. Pub. US 2008/0155790 is hereby incorporated by reference into the specification of the present invention.

SUMMARY OF THE INVENTION

The present invention is a reusable tamper indicating bag closure that can be used to transport almost any item such as documents and portable computing devices including laptops, PDAs, mobile phones, iPods® . . . etc.

Another object of the present invention is to make available a tamper indicating bag closure that would make almost any bag reusable, thus making it appealing to a broad spectrum of customers including the individual buyer, the business user, and the government user.

The tamper-evident bag closure which is the subject of this patent invention comprises a lid, a base, a plurality of knobs, a plurality of hasps, a locking mechanism that is placed through an opening on the base and rests within an insertion aperture on the lid such that locking the lock mechanism causes the lid to slide into alignment with the base and engages the plurality of hasps with the plurality of knobs thus securing the bag. The bag closure also has several tamper indicating features including the use of tamper indicating markers, wire seals and tamper indicating labels.

DETAILED DESCRIPTION

The present invention is a reusable tamper indicating bag closure that can be used with any bag to transport documents or objects that may contain information that needs to be protected such as portable computing devices, laptops, PDA, mobile phones, iPods . . . etc. This bag closure can be sized to be used with any type of bag. While several means for securing the bag closure and making the bag closure tamper proof are discussed below, not all available methods must be used by the user simultaneously. Rather, the user can choose which securing and tamper-proofing means to utilize depending on the situation.

Figure 1A:
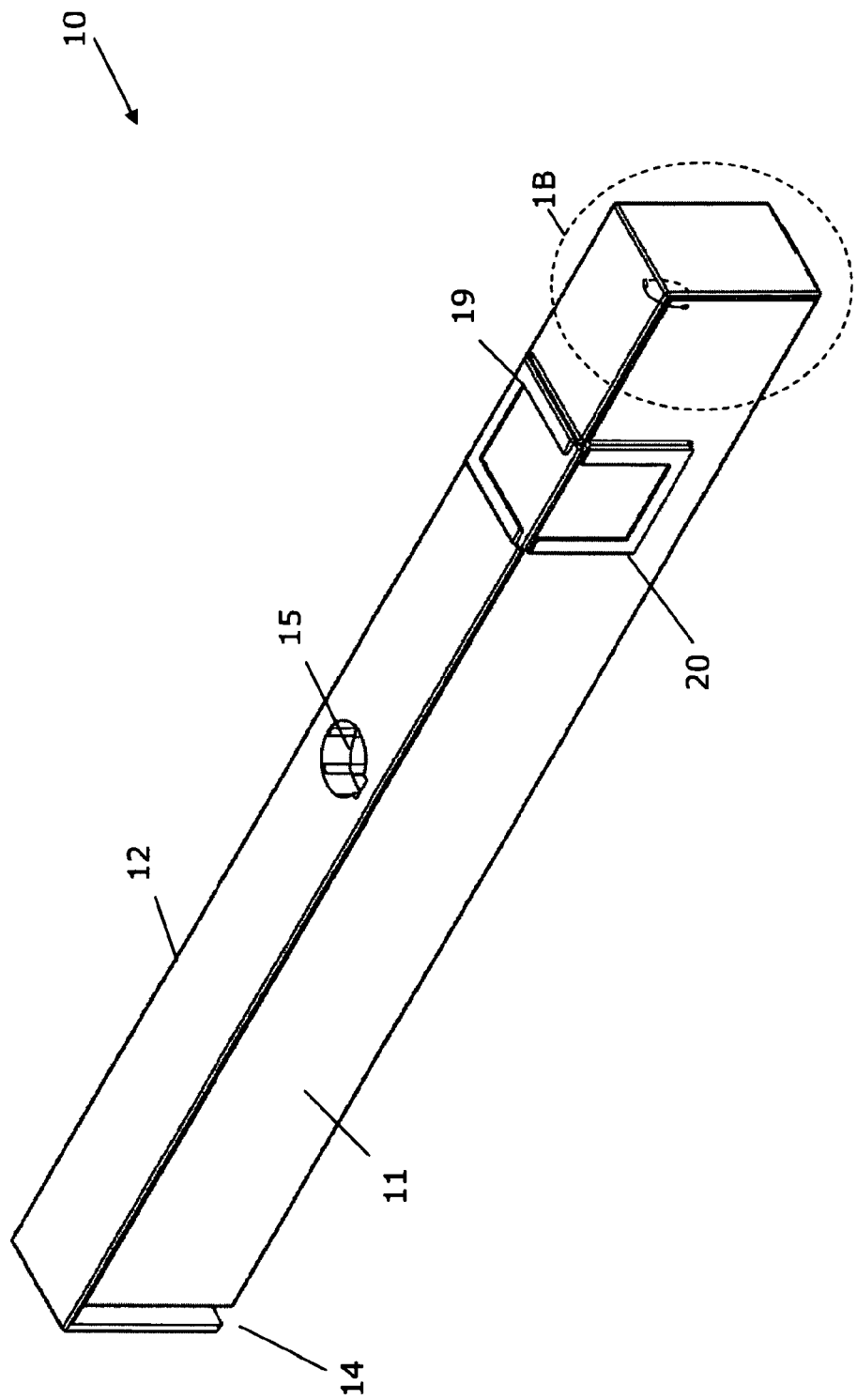
FIGS. 1A-1B are a perspective view of the tamper resistant bag closure and partial view of the tamper resistant bag closure respectively.

FIG. 1A is a perspective view of the tamper resistant bag closure 10. FIG. 1A depicts a tamper resistant bag closure 10 with a lid 11 and a base 12. The bag closure 10 can be secured using a locking mechanism (shown in FIGS. 2 and 6). The locking mechanism is composed of a lock that is enclosed within a tamper evident lock cover. To ensure that the bag closure 10 is truly in a "locked state", the preferred embodiment of the bag closure will not allow the user to insert the locking mechanism, unless all of the hasps (not shown) are fully engaged. In addition, the key cannot be removed unless the user rotates the key completely to the locked position. Alternative embodiments (not shown) of the present invention, include a bag closure 10 that can be fabricated with multiple removable locks or an integrated locking mechanism or an immovable lock that is enclosed within a tamper evident lock cover. In each embodiment, the user must turn the key to a locked position, causing the locking bolt of the integrated locking mechanism to rotate and simultaneously push the lid 11 into alignment with the base 12, engaging all the hasps (not shown) and creating a gap 14.

While this bag closure can be made using a variety of materials, the preferred embodiment should be fabricated from translucent hard plastics so that the bag closure 10 cannot be accessed by cracking the bag closure and tampering attempts will be visible easily. Any embodiment of the bag closure 10 should be manufactured to withstand a drop such that "normal" usage will not result in a tamper event. The preferred embodiment of the bag closure 10 has rounded corners and double walls so as to make it more difficult to conceal an attempt to cut or pry into the bag closure. The preferred embodiment of the invention also uses a plastic molded with fleck or some unique identifier to deter substitution of any part of the bag closure 10 that has been tampered with. Also, the bag closure 10, or lid 11, or base 12, can include serial numbers or other means to uniquely identify the bag closure, lid, or base respectively to thwart substitution attack. Alternative embodiments can be designed such that specific areas are made thinner to make prying visible.

Figure 1B:
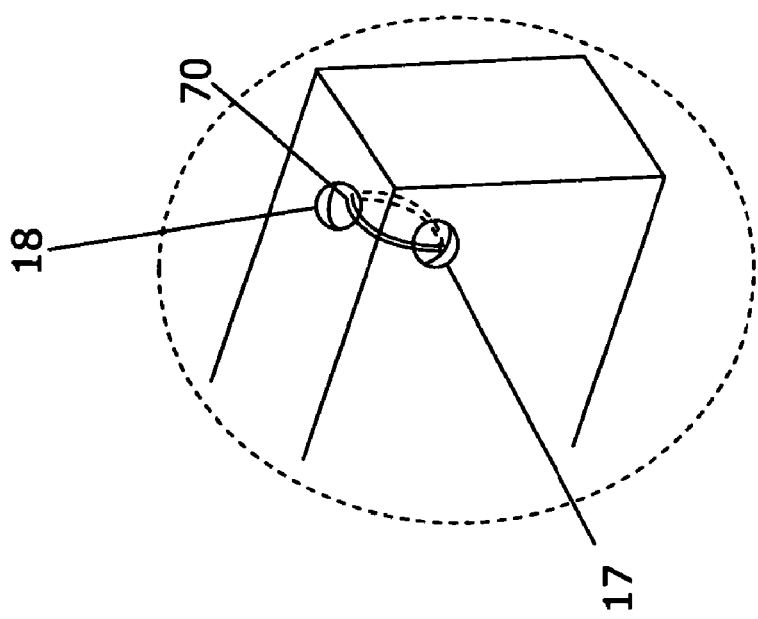
Figure 2:
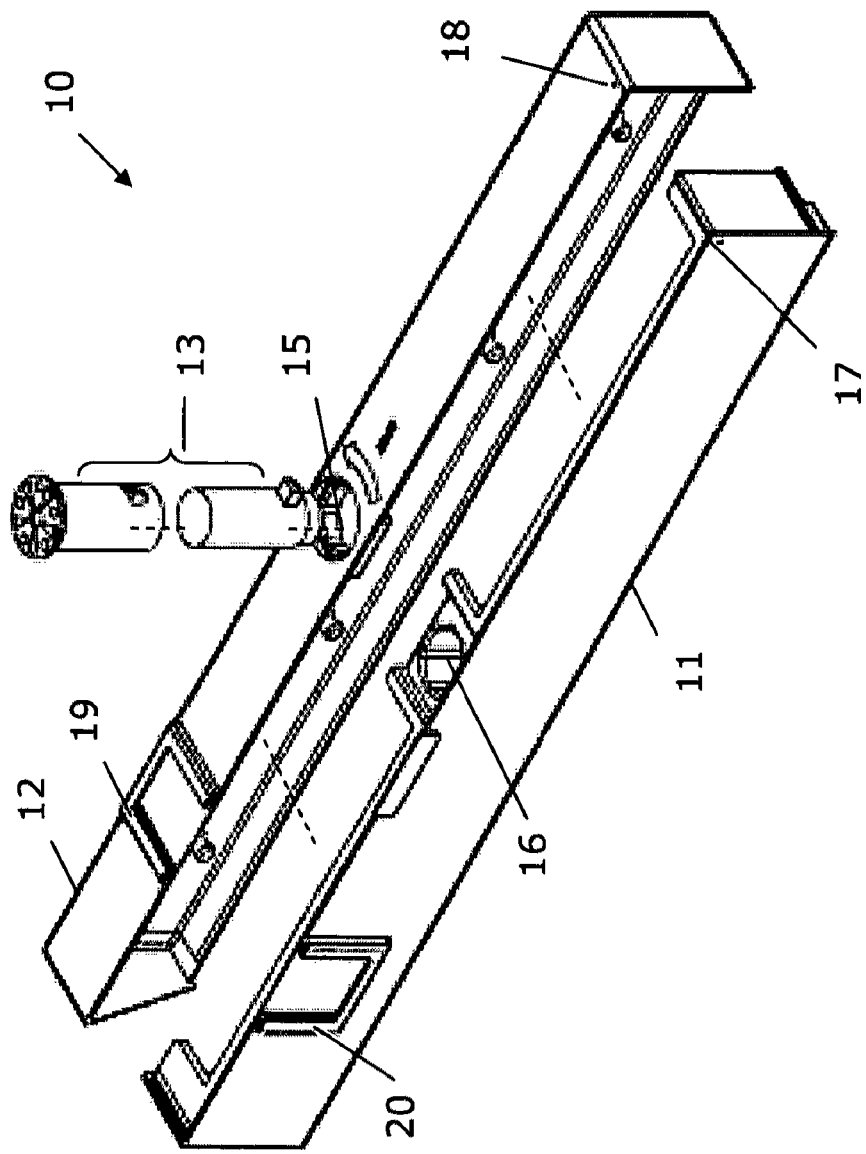
FIG. 2 is an exploded view of the tamper resistant bag closure including a locking mechanism.

FIG. 1B shows the use of a wire loop seal 70 to secure the device 10. Once the lid 11 is secured to the base 12, a wire loop seal 70 is placed though the vias 17, 18 on the lid 11 and the base 12. This will further secure the device 10. FIG. 2 is an exploded view of FIG. 1A. FIG. 2 depicts an opening 15 on the base 12 through which a locking mechanism 13 is placed so that it will rest within the insertion aperture 16 on the lid 11. Additionally, the bag closure 10 has a user-definable number of vias 17 on the lid 11 that are aligned with a user-definable number of vias 18 on the base 12 to use with wire loop seal tamper detection devices 70 (shown in FIG. 1B). Also, the bag closure 10 has a user-definable number of top brackets 19 on the exterior perimeter of the lid 11 and a user-definable number of bottom brackets 20 on the exterior edge of the base 12 such that the top brackets 19 and bottom brackets 20 are aligned when the lid 11 is secured to the base 12 and can receive a tamper indicating label (not shown) as disclosed in U.S. Pat. No. 7,201,410 or any other suitable label.

Figure 3:
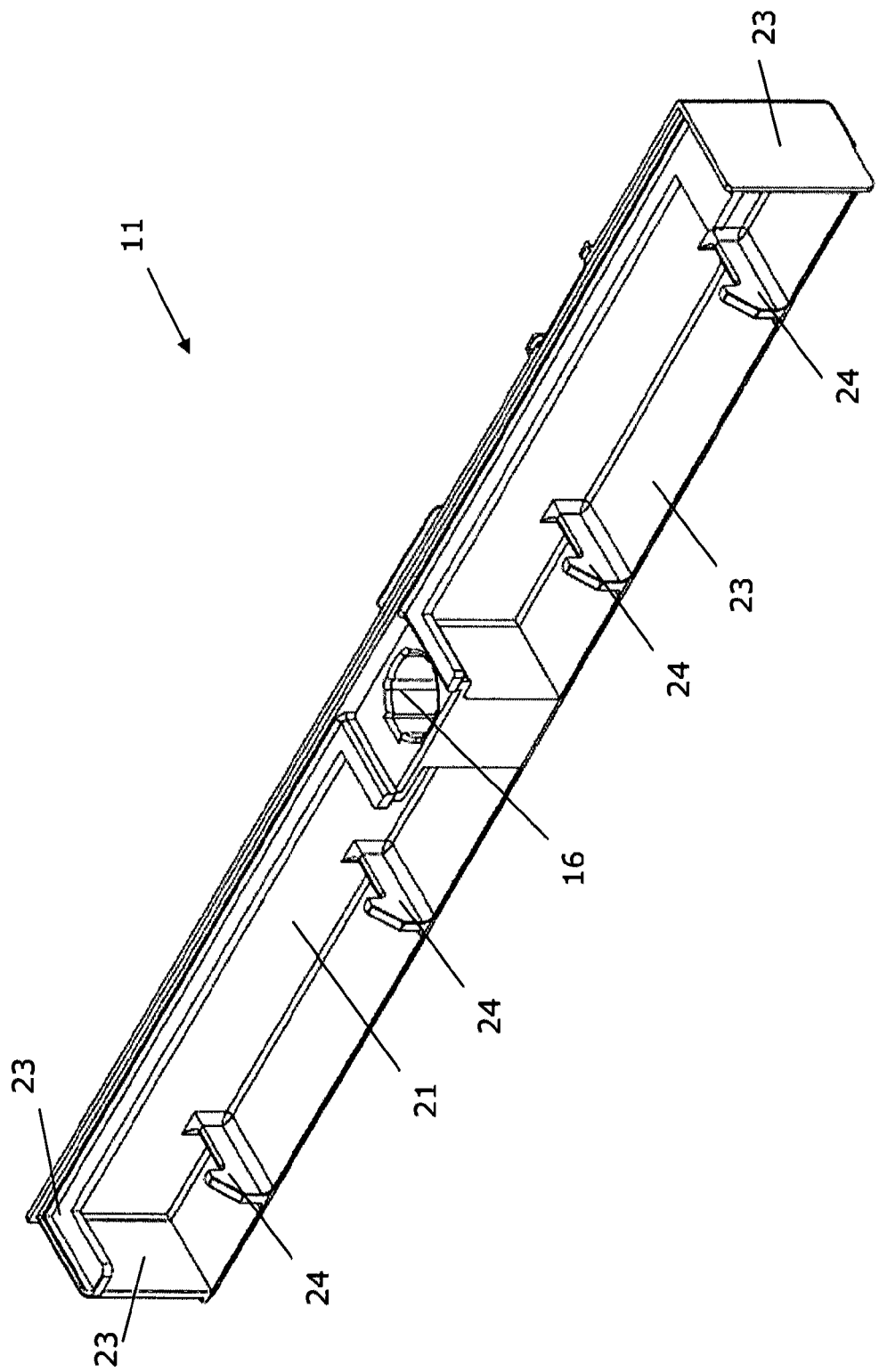
FIG. 3 is a view of the lid of the tamper resistant bag closure.

FIG. 3 depicts the lid 11 of the tamper indicating bag closure 10 in greater detail. The lid 11 includes a horizontal planar surface 21, a plurality of hasps 24, and an insertion aperture 16 that is in alignment with the opening 15 on the base 12 when the lid 11 is secured to the base 12. In FIG. 3, the horizontal planar surface 21 of the lid 11 is comprised of a plurality of side walls 23 that define the exterior perimeters of the lid 11. Each side wall 23 has a user-definable length, a user-definable height, and a user-definable thickness which form a rounded corner where two side walls 23 meet. One of the side walls has an indentation (not shown) along the side wall such that when the lid 11 is placed on top of the base 12, the lid 11 rests within and is flush with the base 12 thus securing the bag and its contents.

The lid 11 also contains hasps 24 that are molded onto one of the side walls 23 such that when the hasps 24 that are located on the lid 11 are aligned with the knobs that are on the base 12, the bag closure 10 is secured. Both the lid 11 and the base 12 have rounded corners.

Figure 4:
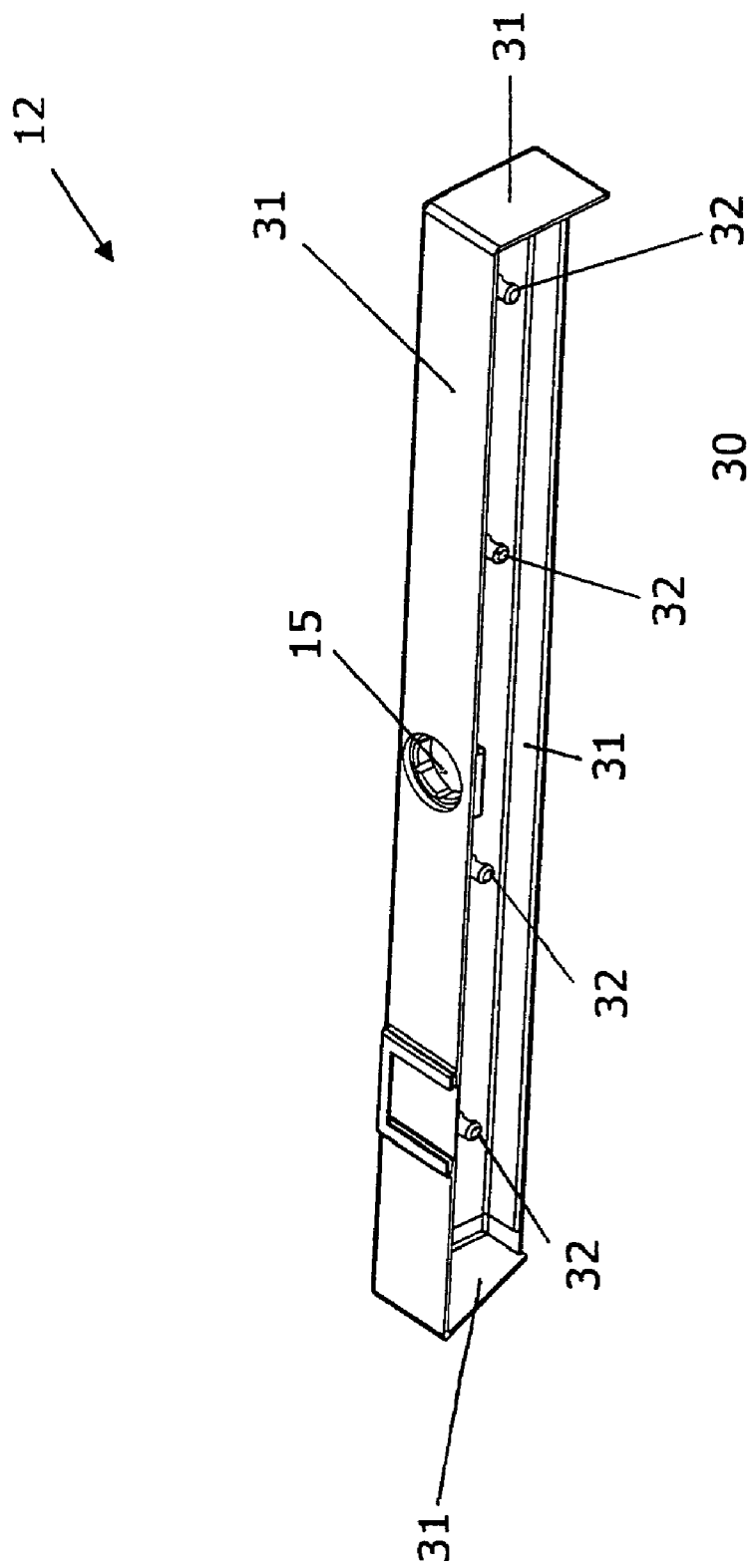
FIG. 4 is a view of the base of the tamper resistance bag closure.

FIG. 4 is a view of the base of the tamper resistance bag closure. FIG. 4 depicts the base 12 which is composed of a horizontal planar surface 30, a plurality of side walls 31 that are perpendicular to the horizontal planar surface 30, and a plurality of knobs 32 to hold the bag being secured. One of the side walls 31 contains an opening 15 that holds the locking mechanism (not shown here) as well as a user-definable number of vias. The side walls 31 of the base 12 are of a user-definable length, a user-definable height, and a user-definable thickness. These side walls 31 define an exterior edge of the bag closure 10 and where two side walls 34 meet, a rounded corner is formed.

Figure 5:
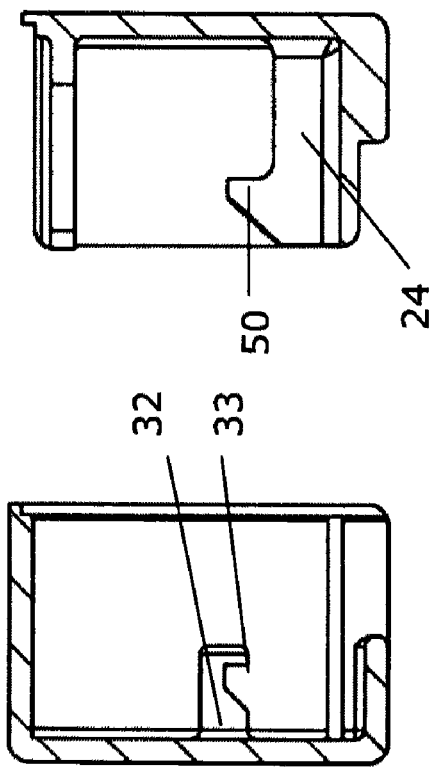
FIG. 5 is a perspective view of the hasps used with the tamper resistant bag closure.

FIG. 5 is a perspective view of the hasps used with the tamper resistant bag closure. FIG. 5 presents a closer look at how the hasps 24 on the lid align with the knobs 32 on the base when the bag closure 10 is secured (lid, base, and bag closure not shown in this figure). The hasps 24 on the lid 11 contain an attached lip 50 that slides in under the indentation 33 on the knobs 32 on the base, securing the lid 11 to the base 12. Both the hasps 24 on the lid 11 and the knobs 32 on the base 12 can include tamper evident user-definable markings.

Figure 6:
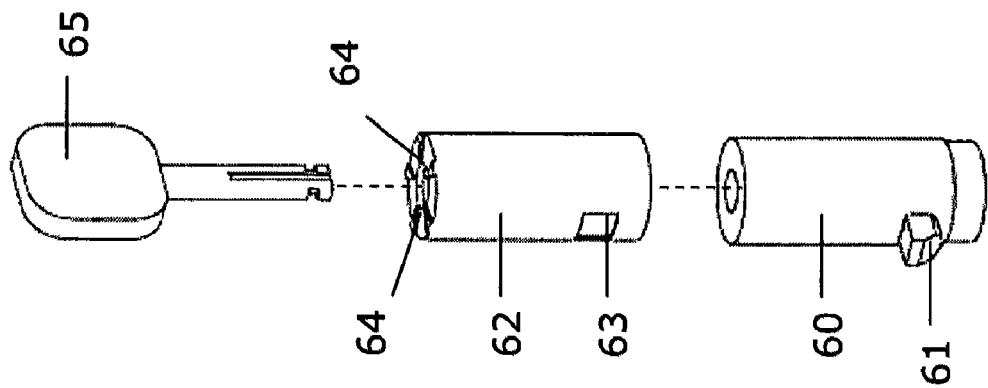
FIG. 6 is an exploded view of the locking mechanism used with the tamper resistant bag closure.

FIG. 6 is an exploded view of the locking mechanism used to secure the bag closure 10 (bag closure not shown) present in the preferred embodiment. A removable lock 60 with a locking bolt 61 is enclosed within a tamper evident lock cover 62 which contains an opening 63 for receiving the locking bolt 61. The tamper evident lock cover 62 allows for easy use of the key 65 to unlock the bag closure 10 while allowing the detection of any unwanted attempt to remove the lock. The tamper evident lock cover 62 also contains a number of tamper evident user-definable markings 64 that will display proof of an attempt to tamper with the lock. These tamper evident user-definable markings 64 require much effort to duplicate or substitute the markings. The tamper evident lock cover 62 can also be fabricated with various tamper indicating features including the use of a plastic colorant that allows the highlighting or light piping of light to help show where a cut is or thinning of the plastic to create a stress concentration that would allow cracking to occur if pried upon. Additionally, techniques to determine substitution of the tamper evident lock cover 62 include the use of serial numbers, swirl or marbleized colors, and fleck.

While the preferred embodiment has been disclosed and illustrated, a variety of substitutions and modifications can be made to the present invention without departing from the scope of the invention.

What is claimed is:

1. A tamper-evident bag closure, comprising:
   a) a base, having a horizontal planar surface, a plurality of knobs for receiving a bag, and a plurality of side walls that are perpendicular to said horizontal planar surface, where one of said side walls has an opening;
   b) a lid, having a horizontal planar surface, a plurality of side walls that are perpendicular to said horizontal planar surface where one of said side walls contains a plurality of hasps, and an insertion aperture on said horizontal planar surface; and
   c) a locking mechanism placed through said opening of said base and inserted within said insertion aperture such that locking said lock mechanism causes said lid to slide into alignment with said base and engages said plurality of hasps with said plurality of knobs thus securing said bag.

2. The device of claim 1, wherein said plurality of side walls of said base each have a user-definable length, a user-definable height, and a user-definable thickness defining an exterior edge of said base.

3. The device of claim 2, wherein said plurality of side walls of said lid each have a user-definable height, a user-definable thickness, and a user-definable length that is less than said user-definable length of said base.

4. The device of claim 3, wherein said plurality of hasps are adjacent to one of said side walls of said lid and perpendicular to said horizontal planar surface of said lid, each including an attached lip that when said lid is secured to said base, said plurality of hasps align with said plurality of knobs.

5. The device of claim 3, further comprising:
  a) a first user-definable number of top brackets on one of said side walls of said base; and
  b) a second user-definable number of bottom brackets on one of said side walls of said lid such that said top brackets and said bottom brackets are aligned when said lid is secured to said base for receiving a tamper indicating label.

6. The device of claim 4, wherein said lid and said base are translucent.

7. The device of claim 6, wherein said locking mechanism further includes:
  a) a locking bolt that rotates when the locking mechanism is locked; and
  b) a tamper evident cover over said locking bolt.

8. The device of claim 1, wherein said plurality of side walls of said lid each have a user-definable height, a user-definable thickness, and a user-definable length that is less than said user-definable length of said base.

9. The device of claim 1, wherein said plurality of hasps are adjacent to one of said side walls of said lid and perpendicular to said horizontal planar surface of said lid, each including an attached lip that when said lid is secured to said base, said plurality of hasps align with said plurality of knobs.

10. The device of claim 1, further comprising:
  a. a first user-definable number of top brackets on one of said side walls of said base; and
  b. a second user-definable number of bottom brackets on one of said side walls of said lid such that said top brackets and said bottom brackets are aligned when said lid is secured to said base for receiving a tamper indicating label.

11. The device of claim 1, wherein said lid and said base are translucent.

12. The device of claim 1, wherein said locking mechanism further includes:
  a. a locking bolt that rotates when the locking mechanism is locked; and
  b. a tamper evident cover over said locking bolt.

\* \* \* \* \*